(12) United States Patent
Martinez et al.

(10) Patent No.: US 8,162,076 B2
(45) Date of Patent: Apr. 24, 2012

(54) SYSTEM AND METHOD FOR REDUCING THE BOREHOLE GAP FOR DOWNHOLE FORMATION TESTING SENSORS

(75) Inventors: Ruben Martinez, Houston, TX (US); Attilio Pisoni, Dubai (AE); Jan W. Smits, Sugar Land, TX (US); Reza Taherian, Sugar Land, TX (US); Simon Bittleston, Drayton (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 171 days.

(21) Appl. No.: 11/421,945

(22) Filed: Jun. 2, 2006

(65) Prior Publication Data

US 2008/0053707 A1 Mar. 6, 2008

(51) Int. Cl.
*E21B 47/00* (2006.01)
*E21B 49/00* (2006.01)
(52) U.S. Cl. ............ 175/40; 175/61; 175/50; 175/325.1
(58) Field of Classification Search .................... 175/40, 175/61, 325.1, 50
See application file for complete search history.

(56) References Cited

U.S. PATENT DOCUMENTS

| | | | |
|---|---|---|---|
| 4,881,406 A * | 11/1989 | Coury | 73/152.03 |
| 5,242,020 A | 9/1993 | Cobern | |
| 5,265,682 A | 11/1993 | Barr et al. | |
| 5,553,678 A | 9/1996 | Barr et al. | |
| 5,695,015 A | 12/1997 | Barr et al. | |
| 5,803,185 A | 9/1998 | Barr et al. | |
| 6,089,332 A | 7/2000 | Barr et al. | |
| 6,173,793 B1 | 1/2001 | Thompson et al. | |
| 6,179,066 B1 | 1/2001 | Hughes | |
| 6,516,900 B1 | 2/2003 | Tokle | |
| 6,564,883 B2 | 5/2003 | Fredericks et al. | |
| 6,622,803 B2 * | 9/2003 | Harvey et al. | 175/325.3 |
| 6,660,321 B2 | 12/2003 | Efstathiou | |
| 6,843,117 B2 * | 1/2005 | Kurkjian et al. | 73/152.01 |
| 2005/0001624 A1 | 1/2005 | Ritter et al. | |
| 2005/0006090 A1 | 1/2005 | Chemali et al. | |
| 2005/0019542 A1 | 1/2005 | Hojaji et al. | |
| 2005/0056421 A1 | 3/2005 | Homan et al. | |
| 2005/0056463 A1 | 3/2005 | Aronstam | |
| 2005/0067190 A1 | 3/2005 | Tabanou et al. | |
| 2005/0241858 A1 * | 11/2005 | Eppink et al. | 175/325.1 |
| 2006/0113113 A1 * | 6/2006 | Underwood et al. | 175/61 |
| 2007/0163808 A1 * | 7/2007 | Campbell et al. | 175/57 |
| 2007/0163810 A1 * | 7/2007 | Underwood et al. | 175/61 |

FOREIGN PATENT DOCUMENTS

GB 2251014 6/1992
* cited by examiner

*Primary Examiner* — Giovanna Wright
(74) *Attorney, Agent, or Firm* — Charlotte Rutherford; Darla P. Fonseca; Shaun B. Sethna

(57) ABSTRACT

A system and method for downhole measurement for use with drill strings to reduce the borehole gap with respect to sensors carried by the drill string. In one embodiment, the sensors are mounted on a surface of the directional drilling hinged pad that comes in contact with the borehole wall. The hinged pad is pressed against the borehole wall as contact is made with the wall, thereby keeping the sensors at a minimum gap with respect to the wall. In another embodiment, the hinged pad is not used for directional drilling. Therefore the hinged pad is extended outward to the wall with the minimum necessary amount of force. Activation of the hinged pad can be initiated, for example, by flow of mud in the annulus of the string or through a user-provided command. The sensors can include resistivity, density, neutron, electromagnetic, acoustic, seismic, and NMR measurement sensors.

13 Claims, 6 Drawing Sheets

SYSTEM AND METHOD FOR REDUCING THE BOREHOLE GAP FOR DOWNHOLE FORMATION TESTING SENSORS

TECHNICAL FIELD

This disclosure relates to making formation measurements while drilling a well, and more particularly to systems and methods for reducing the borehole gap for downhole sensors.

BACKGROUND OF THE INVENTION

It is common practice while drilling a borehole to make measurements while drilling (MWD) or to log while drilling (LWD). The sensors used to make such measurements perform much better if they are in close contact with the formation of interest. Standoff, or gap, between the sensor and the formation reduces the measurement accuracy and the resultant test data are subject to correction for these gap errors. Thus, it is desired to place the sensors such that they are in substantial contact with the formation. To achieve such contact, or near contact, sensors are placed on the drill collar, and in some situations, on the outside of the drill collar. Traditionally, deep looking sensors used in LWD and MWD are mounted on the drill collar. In this approach, the sensors are displaced (typically a few inches) from the borehole wall. In many situations the depth of investigation of the tool is large (on the order of feet), and thus the effect of the gap between the borehole and the formation can be ignored or corrected.

Shallower looking devices, however, may be strongly affected by the borehole signal (the error signal caused by the gap), to the extent that, in extreme cases, the formation signal is overwhelmed by the borehole signal and rendered useless. Measurement techniques such as shallow resistivity, density, and neutron fall in this category. To avoid the borehole signal problem, the tendency is to place some sensors on parts of the drilling assembly that are in very close proximity to the formation.

U.S. Pat. No. 6,173,793 discloses a non-rotating sleeve for dealing with the standoff problem. The '793 patent suggests the idea of using a non-rotating sleeve on top of which the sensor is mounted. The sensor can be mounted on the surface of a fixed or an extendable pad that helps bring the sensor in contact with the borehole wall to eliminate, or at least reduce, the borehole signal. Designs are available to accommodate a variety of formation evaluation sensors, such as density, nuclear magnetic resonance (NMR), resistivity, acoustic, or electromagnetic.

U.S. Pat. No. 6,564,883 teaches the placement of sensors close to the formation. The '883 patent takes advantage of non-rotating sleeves that are used as one approach to achieve directional drilling. As with the '793 patent, the sensors are placed on a pad that is mounted on an extended rib, which in turn is attached to the non-rotating sleeve. The extended pad is actuated using hydraulic or electrical motors. Once actuated, the pad comes in contact with the surface of the borehole, allowing the sensors to make substantially borehole independent measurements.

U.S. Pat. No. 6,660,321 is directed to a resistivity device for imaging in wells drilled with oil-based mud. The '321 patent is directed to a pad, or an arm, that extends from a non-rotating sleeve. The '321 patent also suggests the possibility of using the stabilizer as a place for the sensor.

Published Patent Application US 2005/0001624 suggests a structure holding the sensor that protrudes from the drill string causing the sensors be closer to the borehole wall. The stabilizer is suggested as a place to position the sensors. The device described is for resistivity imaging of the borehole wall.

Published Patent Application US 2005/0006090 discloses the use of an extendable stabilizer with the sensor residing on the face of an extendable stabilizer. The stabilizer extends from the drill string to come in contact with the borehole wall. The extendable stabilizer helps bring the sensor closer to the borehole wall and reduces the borehole signal. The '090 application is for electrical imaging of the borehole wall.

All of the above-mentioned devices rely on non-rotating sleeves and suffer from at least three limitations. First, the non-rotating sleeve reduces the number of measurements. In the situation when the sleeve is completely stationary, the measurement from the sensor is limited to only one point on the circumference of the borehole wall, leading to limited azimuthal coverage. Even if the sleeve is slowly rotating, at higher rates of penetration the sensor may sample a helical path along the borehole wall and the resulting measurement will lack full coverage.

Second, the non-rotating sleeve is not used in all directional drilling approaches and may not be present in a drill string equipped with alternate directional drilling technologies that use rotating sleeves. The steering in such drilling strings uses hinged pads that contact the formation and it is this contact that changes the direction of the drill bit. Unlike the non-rotating sleeve approach, the hinged pads rotate at the same rotational speed as the entire drill string. At least one existing tool uses three such pads that can be activated/deactivated at three times the rate of drilling string rotation.

The third limitation is that the prior art structures are highly vulnerable to breakage when the tool is rotated. The inherent rugosity of wellbores and motion of the drill collar will cause the pad to be dragged against the wall of the wellbore, placing intolerable loads on the pad.

Patent Application 2005/0056421 shows the use of one or more pistons to carry one or more sensors, wherein each piston can extend to allow the sensor or piston face to contact the formation. In this approach the pistons are pressure balanced with downhole pressure such that the sensors or piston faces contact the borehole wall with minimum applied force and friction with the wall. This arrangement achieves the small standoff objective without producing excessive sensor or piston wear.

U.S. Pat. No. 5,242,020 show a drill string with a tangentially extendable arm deployable against the formation. Sensors are mounted within the arm. This arrangement is intended for situations in which the arm is to be used intermittently, not continuously while drilling. Though the description refers to "re-drilling", this term means making a second pass subsequent to actually drilling the wellbore. The arm and sensors do not enlarge the hole during the subsequent pass as is the case when actually drilling or reaming a wellbore. Thus, the arm and sensors do not experience the extreme loads encountered in a true while-drilling or reaming situation.

BRIEF SUMMARY OF THE INVENTION

A system and method for downhole measurement is disclosed for use with drill strings for reducing the borehole gap with respect to the sensors carried by the drill string. In one embodiment, the sensors are mounted on a surface of the directional drilling hinged pad that comes in contact with the borehole wall. The hinged pad is pressed against the borehole wall as contact is made with the wall, thereby keeping the sensors at a minimum gap with respect to the wall. In another embodiment, the hinged pad is not used for directional drilling. Therefore the pad is extended outward to the wall with the minimum necessary amount of force. That arrangement leads to little or no wear on the sensors. Activation of the hinged pad can be initiated, for example, by flow of mud in the annulus of the string or through a user-provided command. The sensors can include resistivity, density, neutron, electromagnetic, acoustic, seismic, and NMR measurement sensors.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
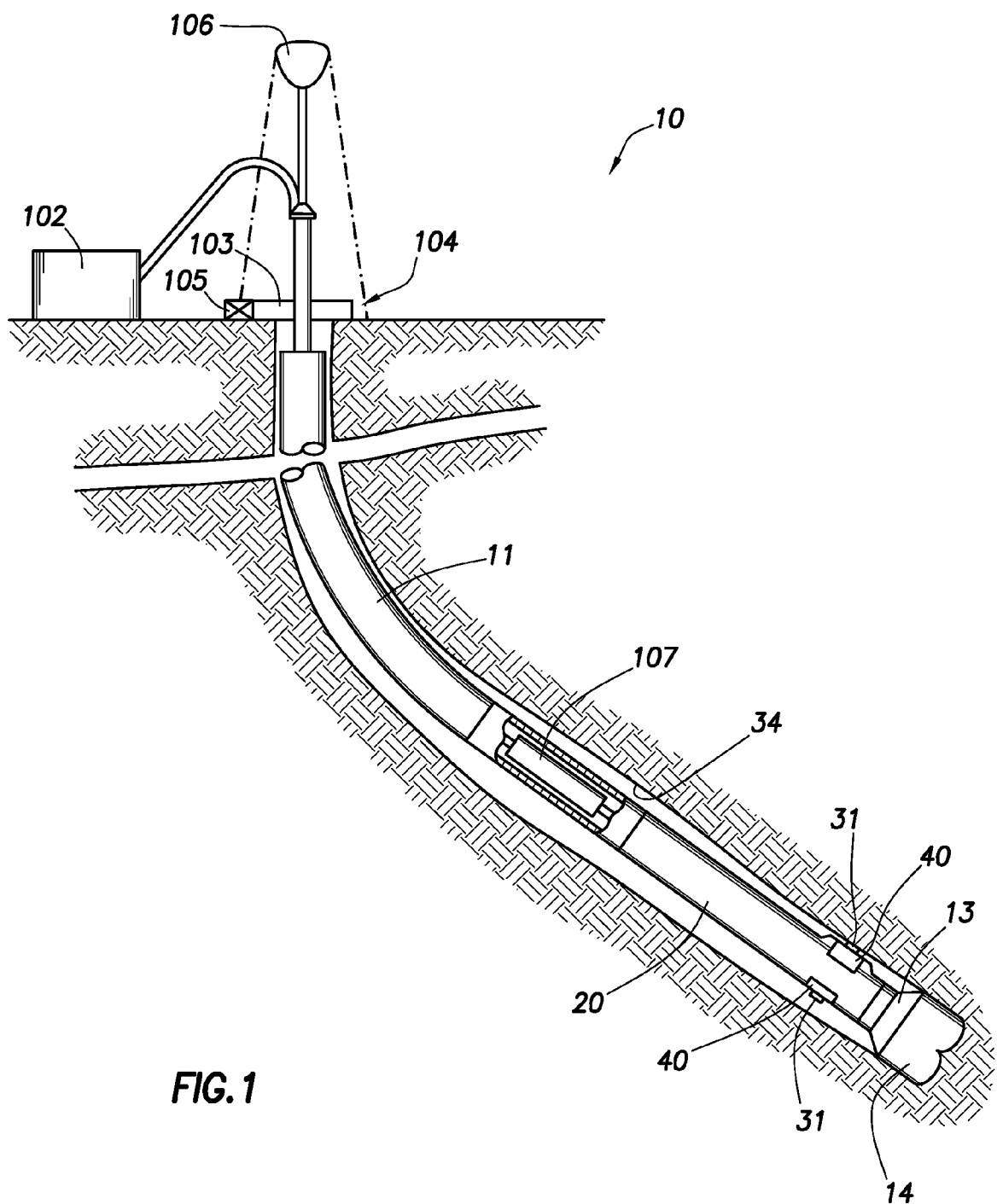
FIG. 1 is a diagram illustrating one embodiment of a drilling installation with which the system and method of the invention may be used.

FIG. 1 shows diagrammatically a typical rotary drilling installation 10 in which the system and method according to the present invention may be employed. In the following description the term "clockwise" refer to the direction of rotation as viewed looking downhole.

As is well known, the bottom hole assembly includes drill bit 14, and is connected to the lower end of drill string 11 which is rotatably driven from the surface by rotary table 103 on a drilling platform 104. The rotary table is driven by a drive motor, indicated diagrammatically at 105, and raising and lowering of the drill string, and application of weight-on-bit, is under the control of draw works, indicated diagrammatically at 106.

The bottom hole assembly includes modulated bias unit 20 which drill bit 14 is connected and roll stabilized control unit 107 which controls operation of direction drilling bias unit 20 in accordance with commands provided to the bias unit 20. Directional drilling bias unit 20 may be controlled to apply a lateral bias to drill bit 14 in a desired direction so as to control the direction of drilling. As will be discussed, drilling direction is controlled by the controlled exertion of pressure against sidewall 34 of the borehole by hinged pad 40 being pushed outward from the drill string.

Figure 2:
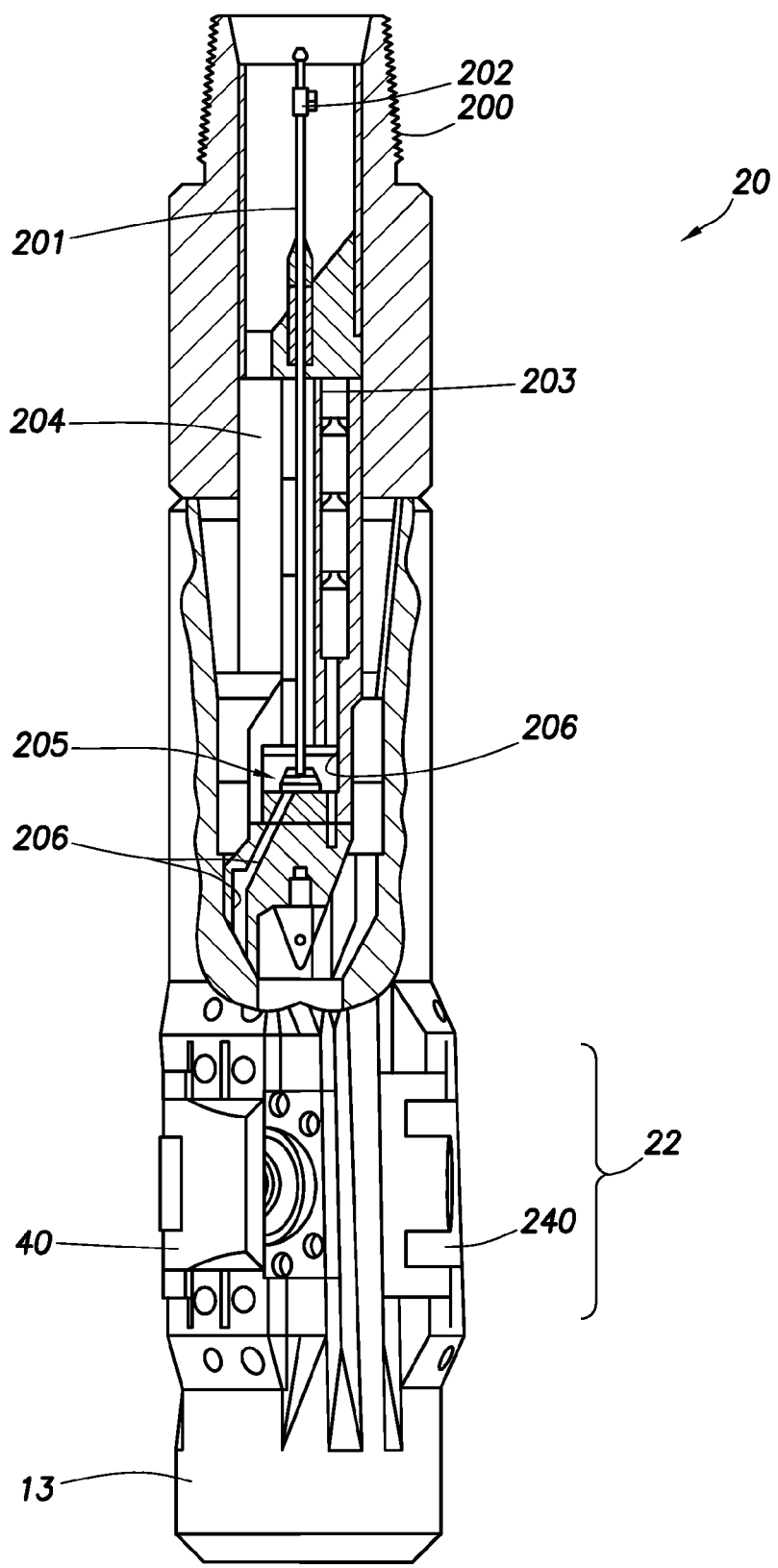
FIG. 2 is a sectional view illustrating part of the downhole assembly of the installation of FIG. 1.

Referring to FIG. 2, directional drilling bias unit 20 comprises an elongate main body structure provided at its upper end with a threaded pin 200 for connecting the unit to a drill collar, incorporating roll stabilized control unit 107 (FIG. 1), which is in turn connected to the lower end of the drill string. Lower end 13 of the body structure is formed with a socket to receive the threaded pin of the drill bit 14.

There are provided around the periphery of the directional drilling bias unit 20, towards its lower end, three equally spaced hydraulic actuators 240. Each hydraulic actuator 240 is supplied with drilling fluid under pressure through a respective passageway 206 under the control of a rotatable disc valve 205 located in passageway 206 in the body structure of the bias unit 20. Drilling fluid delivered under pressure downwardly through the interior of the drill string, in the well-known manner, passes into central passage 204 in the upper part of the bias unit 20, through a filter, and through inlet 203 to be delivered at an appropriate pressure to passageway 206.

Disc valve 205 is controlled by axial shaft 201. Axial shaft 201 is connected by coupling 202 to the output shaft of the control unit 107, which in this embodiment is roll stabilized (i.e. non-rotating in space). The control unit 107, when roll stabilized, maintains the shaft 201 substantially fixed at a rotational orientation that is selected according to the direction in which the drill bit is to be steered. As the bias unit 20 rotates around fixed shaft 201, disc valve 205 operates to deliver drilling fluid under pressure to the three hydraulic actuators 240 in succession. The hydraulic actuators 240 are thus operated (forced outward toward the sidewall of the borehole) in succession as the bias unit 20 rotates, each in the same rotational position so as to displace the bias unit 20 laterally in a selected direction. The selected rotational position of shaft 201 in space thus determines the direction in which the bias unit is actually displaced and hence the direction in which the drill bit is steered.

If shaft 201 is not held in a substantially fixed orientation, then actuators 240 are operated in turn but are not all operated in the same rotational position. As a result, rather than urging the bias unit 20 laterally in a given direction, the direction in which the bias unit 20 is urged changes continuously with the result that there is no net bias applied by the bias unit 20.

Drilling systems of the general type described above are described in greater detail in EP 0520733, EP 0677640, EP 0530045, EP 0728908 and EP 0728909, the content of which is incorporated herein by reference. Schlumberger has successfully made and used such a drilling system in a commercial tool known as POWERDRIVE.

As described above, for a given biasing load applied by the bias unit 20, the rate of change of direction of the bore being formed is influenced by a number of factors. The factors influencing the vertical rate of change, known as the build rate, are not always the same as those influencing the rate of change in the horizontal direction, known as the turn rate.

Figure 3:
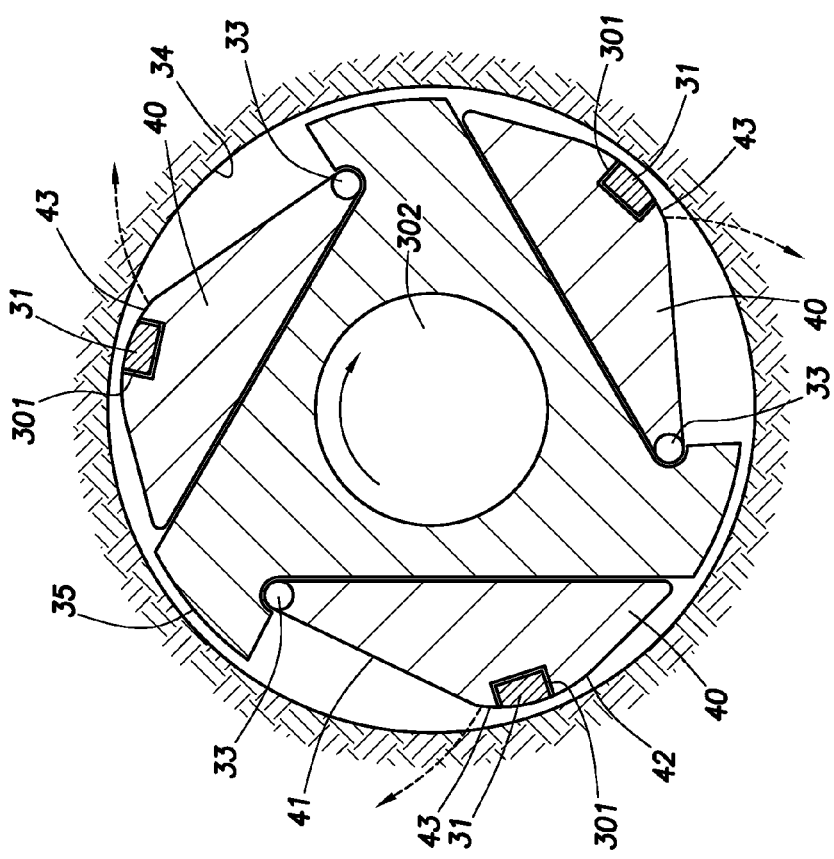
FIG. 3 shows a cross-sectional view looking downward to one embodiment of a triplet pad of a directional drilling assembly having sensors mounted on the pads.

FIG. 3 shows a cross-sectional view of drill collar 35 looking down the borehole inside sidewall 34. Hinged contact pad 40 pivots outward from drill collar 35 around hinge 33. Contact pad 40 rotates outward generally tangential to drill collar 35. Drill collar 35 is shown with center hole 302. Face 41, 42 of contact pad 40 is curved with increasing curvature away from the hinge. This curvature causes the pad face to peak at face 43 before curving back. The peak, or ridge, 43 (shown also in FIG. 4) is where most of the contact with borehole sidewall 34 occurs. The curvature of the pad 40 facilitates pad motion along the length and circumference of the borehole and allows the pad 40 to move back away from the formation to control contact with the formation.

At least one sensor 31 can be placed anywhere on face 41, 42, 43 of pad 40 and preferably within sensor placement area 301. The placement area is designed such that the outer end of sensor 31 is positioned roughly level with face 41, 42, 43. As will be discussed herein, sensors 31 could be positioned all along face 41, 42, 43. However, if the closest possible contact with the borehole wall is desired, the optimum location for placing sensors is at ridge 43. It will be clear to those skilled in the art that the sensors 31 placed on ridge 43 will experience the most friction and suffer the most wear and tear caused by having direct contact with the borehole wall 34. The sensor 31 for this type of application should, of course, be made rugged. However, by moving the sensor 31 (or some of the sensors 31) slightly away from the ridge, the wear can be reduced while the borehole gap is maintained at a minimum distance, for example, less than 0.5 cm, regardless of the contour of the sidewall 34.

Figure 4:
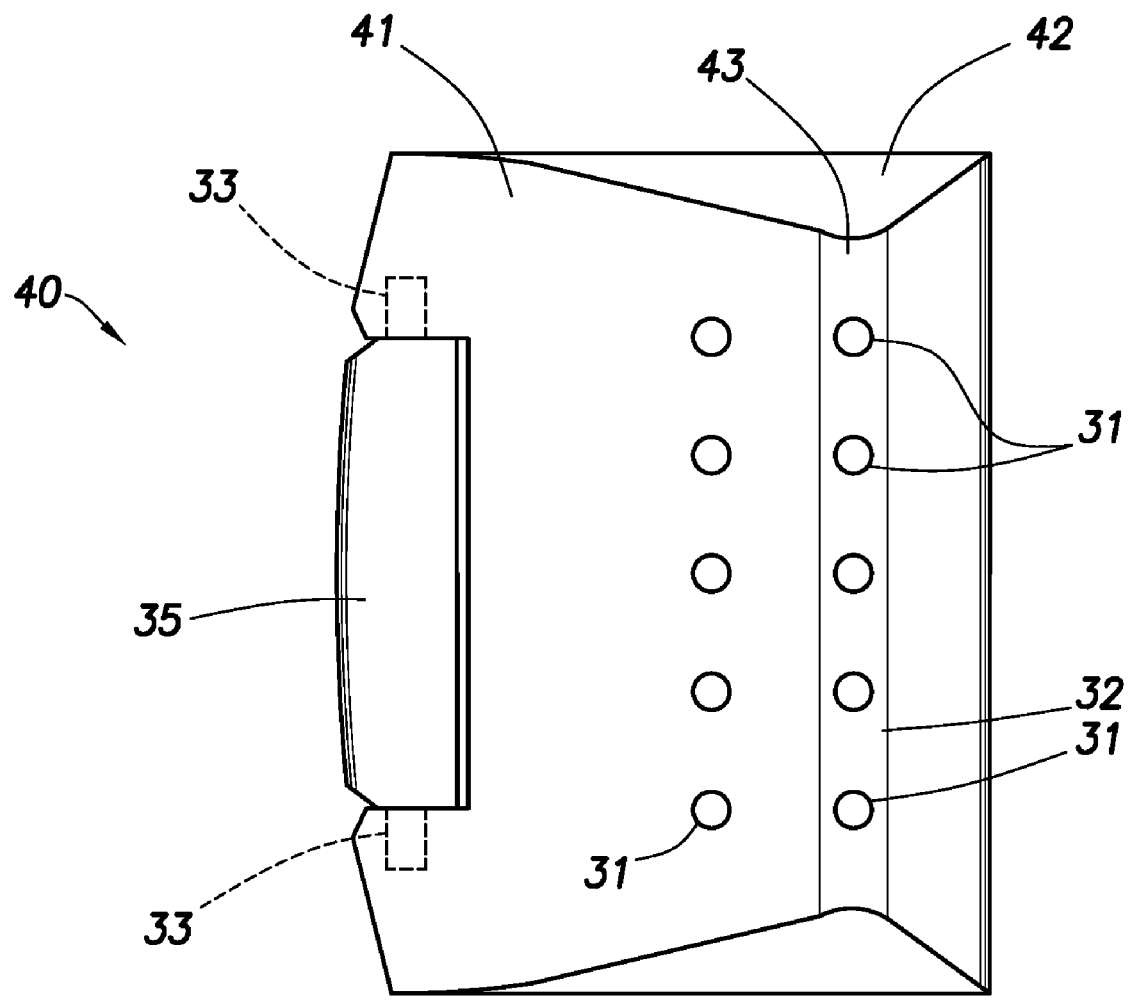
FIG. 4 illustrates one embodiment of a hinged pad with sensors distributed on and off of the pad ridge.

A plurality of sensors 31 can be placed on each of the contact pads, as shown in FIG. 4. These sensors 31 can be of the same type or of different types. Also, the number and the manner of distributing sensors 31 on the ridge depend on the particular sensor design and physics of measurement. Also note that the number of contact pads 40 can vary as well.

FIG. 4 shows one embodiment of pad 40 having ridge 43 for contacting the sidewall 34 of the borehole. Pad 40 pivots around pivot points 33 of drill collar 35 and has sloping faces 41, 42. Note that more than one sensor 31 is positioned in close proximity to ridge 43. These sensors, or some of them, could be positioned surface 41 or 42, or both, depending upon how close to the sidewall 34 the sensor 31 must be positioned.

Figure 5:
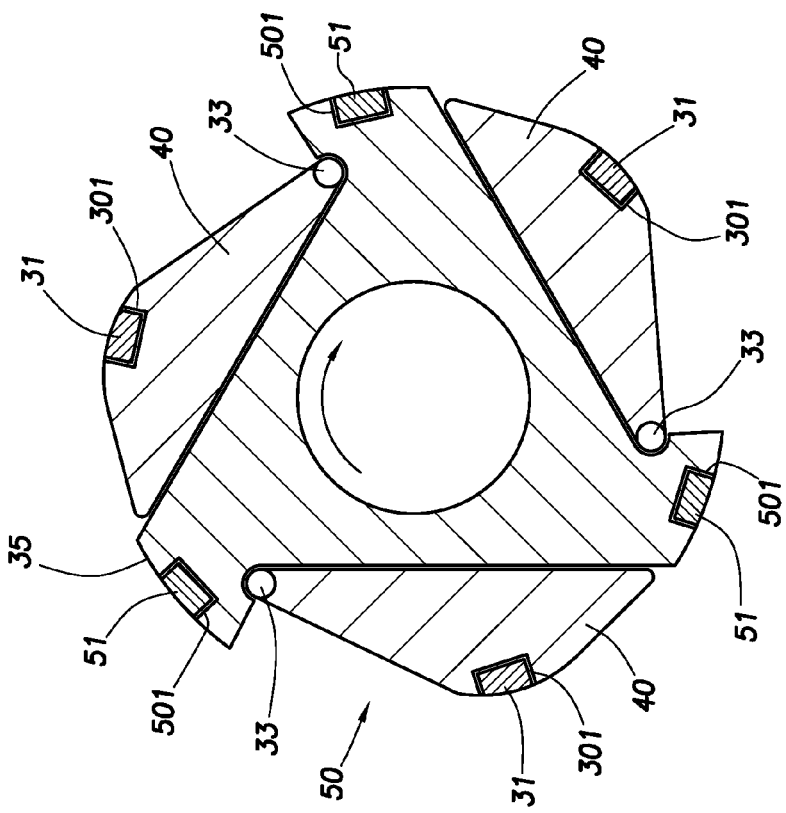
FIG. 5 is a cross-sectional view looking downward to one embodiment of a triplet pad with sensors on both the pad and the drill collar.

FIG. 5 is a cross-sectional view looking downward on one embodiment 50 of a triplet pad with sensors 31 on the pad 40 and sensors 51 on the drill collar 35. In the embodiment shown the pads 40 are the same as shown in FIG. 3. Sensors 51 have been added to drill collar 35 and these sensors, if desired, can be positioned in sensor areas 501.

The measurement concepts, and thus the sensor types, include, but are not limited to, formation resistivity, anisotropy of resistivity, NMR properties, density, gamma ray emissions and other radioactive properties, electrokinetic properties, acoustic properties, seismic properties, dielectric properties, dip angles and locations of bed boundaries, mechanical properties, fluid types and composition, temperature, and pressure.

For some sensors 31 relatively small standoff with the formation can be tolerated. In this case the sensor 31 can still be placed on the face 41, 42 of pad 40, but away from the ridge 43. The sensors 31 may also be recessed below the contact surface of the ridge 43 (as shown in FIG. 4) to protect them. In so doing, the requirements for the sensor ruggedness are somewhat reduced.

Figure 6:
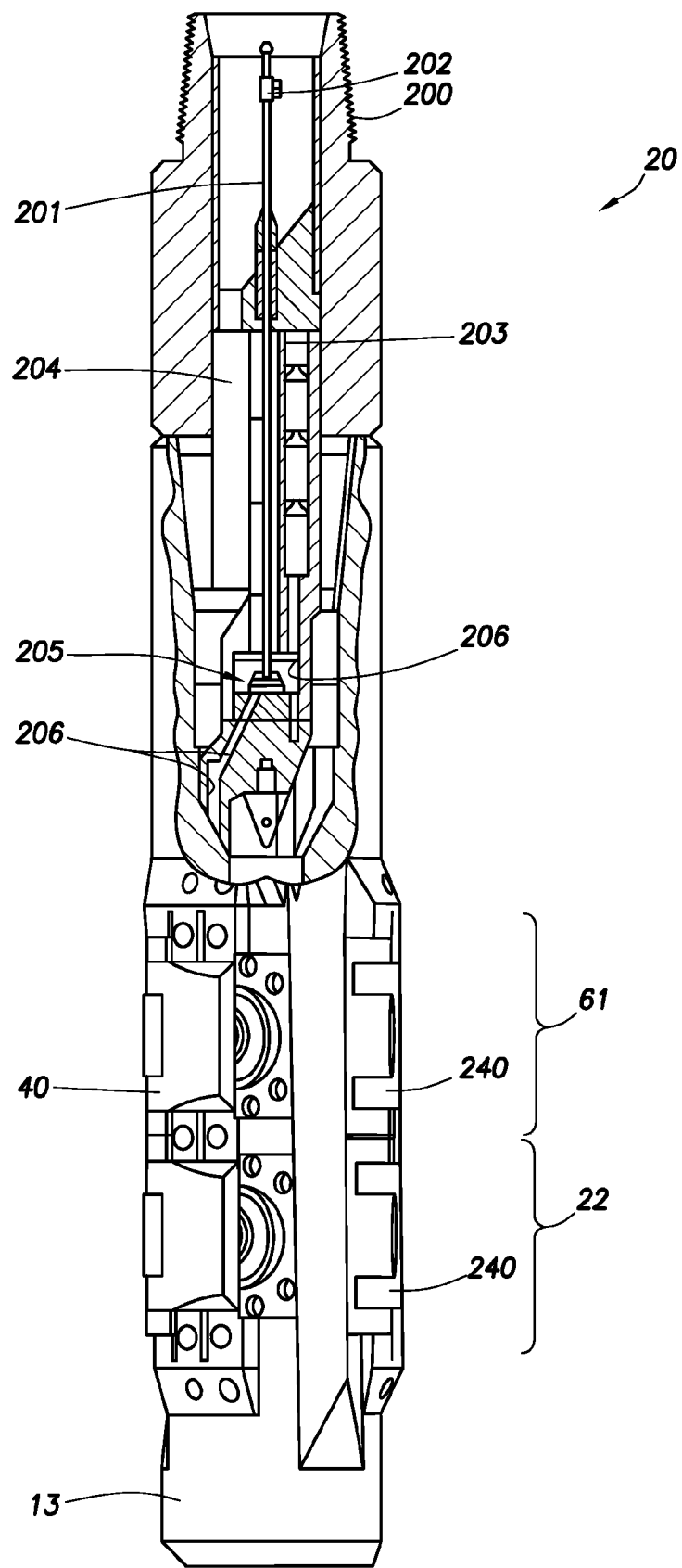
FIG. 6 illustrates a drill string with a second set of pads having sensors mounted thereon.

For measurement of most physical properties, more than one sensor 31 is needed. In these instances, more than one sensor 31 can be placed on the same pad face, as shown in FIG. 4 where several sensors 31 are shown along ridge 43 as well as off of ridge 43. Alternatively, a subset of sensors 31 can be placed on pads 40 spaced apart axially along the drill string as shown in FIG. 6 with respect to pad cluster 22 and pad cluster 61.

When multiple sets of hinged pads 40 are placed along the longitudinal axis of the drill string, the pads 40 are displaced from each other by a certain distance in the longitudinal direction. The two sets of pads 40 may be aligned with each other (in phase), such that their contact pads 40 are lined up, or they may be rotated relative to one another or staggered (out of phase). In this case the sensors 31 can be distributed on the faces of the multiple pads 40, or the distribution of sensors 31 can be such that they are located on a combination of pad faces and other parts of the drill string.

If more than one set of contact pads 40 are present, in most instances only one of the pad sets 40 can be used to alter the drilling direction. The second (or other pad sets) would be for sensor application only. For the second pad set, the mechanism used to apply force on the pad would be modified to apply appropriately less force so that the sensors 31 are in close contact with the borehole wall 34, but not so as to interfere with the drilling or steering operation. In yet another embodiment of the invention, the forcing mechanism responsible for pad application can be modified on both (or all) of the pad sets. In this case none of the pads 40 are used for directional drilling, rather they are used for sensor application only.

The mechanism of forcing the pads against the borehole wall 34 for directional drilling is not shown in FIG. 3 and is well-known in the art. When the pads 40 are used only for sensor application purposes, other approaches, such as electrical motors, mud force, or hydraulic and/or spring actuation mechanisms can be used for control purposes. The preferred actuation mechanism is activated/deactivated by a selective command from the user. In this arrangement, the sensors can be used to make measurements while drilling, while tripping, while sliding, or while stationary.

Note that drill collars and pads can be constructed with a plurality of sensor mounting areas (301, FIG. 3) pre-positioned therein. At the time of installation in a drill hole, one or more sensors 31 can be added as desired. The unused mounting areas can be capped with caps, or allowed to remain open, depending on user preference. Alternatively, the mounting areas can arrive at the job site sealed (by caps or otherwise) and the seals removed only for mounting the necessary sensors.

Figure 7:
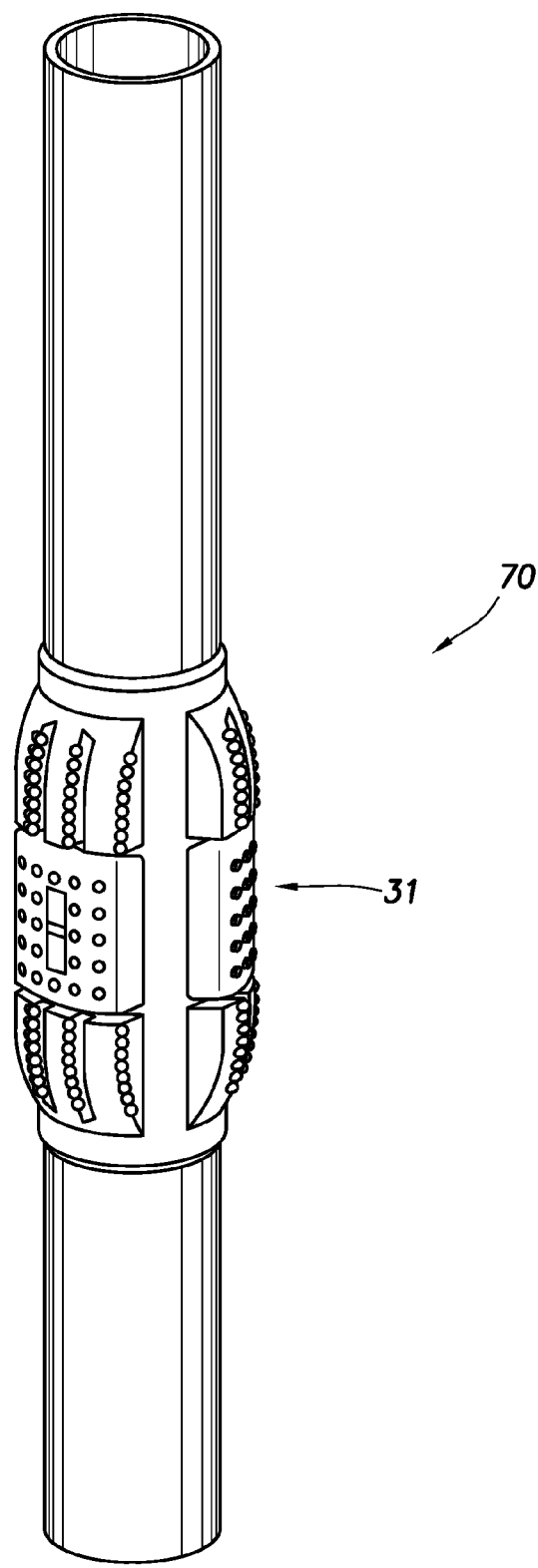
FIG. 7 illustrates a drill string with a reamer having sensors mounted thereon.

In addition to using hinged pads for housing sensors, it is possible to use reamers or expandable reamers 70 for sensor placement (FIG. 7). A reamer 70 comes very close to the borehole wall 34 and the sensors 31 on its face do not suffer from excessive standoff effects. Reamers 70 can be used to scrape off the mud cake, in which case the sensors 31 can be in very near contact with the formation. In addition, a fresh invasion process can start as a result of mud cake removal, which would make ideal conditions for fluid flow measuring sensors such as electrokinetic sensors. During drilling, the drill bit is always at some distance from the measurement pads so that by the time the sensors make measurements, some invasion has taken place and some mud cake has already formed. Having the sensor 31 on the reamer 70 makes it possible to make measurements as a new invasion process starts. This is similar to, but not exactly the same as, having the sensors on the drill bit 14. A hinged pad having sensors can also be mounted just above and adjacent (i.e., in close proximity) to the reamer.

Those skilled in the art appreciate that there are wires and electrical connections between the sensors 31, that are on the surface of the reamer, pad or stabilizer, and the electronic boards that are normally placed inside the drill collar. The number of wires and the mode of connection to the sensors 31 depend on the sensor design. A connection through the wall of collar 35 is achieved using feed-through assemblies.

Although the present invention and its advantages have been described in detail, it should be understood that various changes, substitutions and alterations can be made herein without departing from the scope of the invention as defined by the appended claims. Moreover, the scope of the present application is not intended to be limited to the particular embodiments of the process, machine, manufacture, composition of matter, means, method and steps described in the specification. As one of ordinary skill in the art will readily appreciate from the disclosure of the present invention, processes, machines, manufacture, compositions of matter, means, method, or steps, presently existing or later to be developed that perform substantially the same function or achieve substantially the same result as the corresponding embodiments described herein may be used according to the present invention. Accordingly, the appended claims are intended to include within their scope such processes, machine, manufacture, compositions of matter, means, method, or steps.

What is claimed is:

1. A bottom hole assembly comprising:
 a hinged pad having a first formation sensor disposed thereon;
 a reamer having a face; and
 a second formation sensor placed on the face.

2. The bottom hole assembly of claim 1, wherein the second formation sensor is chosen from a group of measurement types consisting of formation resistivity, anisotropy of resistivity, NMR properties, density, gamma ray emissions and other radioactive properties, electrokinetic properties, acoustic properties, seismic properties, dielectric properties, dip angles and locations of bed boundaries, mechanical properties, fluid types and composition, temperature, and pressure.

3. The bottom hole assembly of claim 1, wherein the reamer is expandable.

4. The bottom hole assembly of claim 3, wherein the second formation sensor is chosen from a group of measurement types consisting of formation resistivity, anisotropy of resistivity, NMR properties, density, gamma ray emissions and other radioactive properties, electrokinetic properties, acoustic properties, seismic properties, dielectric properties, dip angles and locations of bed boundaries, mechanical properties, fluid types and composition, temperature, and pressure.

5. The bottom hole assembly of claim 1, wherein the hinged pad is mounted adjacent to the reamer.

6. The bottom hole assembly of claim 1, wherein the first formation sensor is chosen from a group of measurement types consisting of formation resistivity, anisotropy of resistivity, NMR properties, density, gamma ray emissions and other radioactive properties, electrokinetic properties, acoustic properties, seismic properties, dielectric properties, dip angles and locations of bed boundaries, mechanical properties, fluid types and composition, temperature, and pressure.

7. A method to make formation measurements in a wellbore, comprising:
 positioning a first formation sensor on a face of a reamer;
 positioning a hinged pad adjacent to the reamer, the hinged pad having a second formation sensor disposed thereon;
 disposing the reamer in a borehole;
 scraping mud cake off of the borehole wall;
 making the formation measurements using the first formation sensor.

8. The method of claim 7, wherein the first formation sensor is chosen from a group of measurement types consisting of formation resistivity, anisotropy of resistivity, NMR properties, density, gamma ray emissions and other radioactive properties, electrokinetic properties, acoustic properties, seismic properties, dielectric properties, dip angles and locations of bed boundaries, mechanical properties, fluid types and composition, temperature, and pressure.

9. The method of claim 7, wherein the second formation sensor is chosen from a group of measurement types consisting of formation resistivity, anisotropy of resistivity, NMR properties, density, gamma ray emissions and other radioactive properties, electrokinetic properties, acoustic properties, seismic properties, dielectric properties, dip angles and locations of bed boundaries, mechanical properties, fluid types and composition, temperature, and pressure.

10. A bottom hole assembly comprising:
 a reamer, the reamer comprising a first plurality of cutting elements and a second plurality of cutting elements;
 a first formation sensor disposed between the first plurality of cutting elements and the second plurality of cutting elements; and
 a hinged pad having a second formation sensor disposed thereon.

11. The bottom hole assembly of claim 10, wherein the first formation sensor is chosen from a group of measurement types consisting of formation resistivity, anisotropy of resistivity, NMR properties, density, gamma ray emissions and other radioactive properties, electrokinetic properties, acoustic properties, seismic properties, dielectric properties, dip angles and locations of bed boundaries, mechanical properties, fluid types and composition, temperature, and pressure.

12. The bottom hole assembly of claim 10, wherein the reamer is expandable.

13. The bottom hole assembly of claim 12, wherein the first formation sensor is chosen from a group of measurement types consisting of formation resistivity, anisotropy of resistivity, NMR properties, density, gamma ray emissions and other radioactive properties, electrokinetic properties, acoustic properties, seismic properties, dielectric properties, dip angles and locations of bed boundaries, mechanical properties, fluid types and composition, temperature, and pressure.

* * * * *